United States Patent
Muthiah et al.

(10) Patent No.: US 11,880,594 B2
(45) Date of Patent: Jan. 23, 2024

(54) PROACTIVELY BIASING PARAMETERS OF DATA STORAGE DEVICE BASED ON SPATIAL POSITION IN STORAGE ENCLOSURE

(71) Applicant: Western Digital Technologies, Inc., San Jose, CA (US)

(72) Inventors: Ramanathan Muthiah, Bangalore (IN); Sridhar Sabesan, Bangalore (IN); Dinesh Babu, Bangalore (IN); Pavan Gururaj, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/840,303

(22) Filed: Jun. 14, 2022

(65) Prior Publication Data
US 2023/0401004 A1    Dec. 14, 2023

(51) Int. Cl.
*G06F 3/06*    (2006.01)
*G06F 9/30*    (2018.01)

(52) U.S. Cl.
CPC .......... *G06F 3/0658* (2013.01); *G06F 3/0625* (2013.01); *G06F 9/30029* (2013.01); *G06F 3/0679* (2013.01)

(58) Field of Classification Search
CPC .... G06F 3/06; G06F 1/20–206; G06F 9/4893; G06F 11/3058; G06F 2219/08; G06F 9/30029
See application file for complete search history.

(56) References Cited

U.S. PATENT DOCUMENTS

| | | | |
|---|---|---|---|
| 9,059,736 B2 | 6/2015 | Danilak et al. | |
| 10,528,098 B2 | 1/2020 | Amin-Shahidi et al. | |
| 10,860,521 B2 | 12/2020 | Morning-Smith et al. | |
| 10,930,352 B2 | 2/2021 | Luo et al. | |
| 11,210,001 B2 | 12/2021 | Yang et al. | |
| 2017/0123480 A1* | 5/2017 | Moore, Jr. | G06F 1/3221 |
| 2017/0351632 A1* | 12/2017 | Shaw, II | G06F 13/4068 |
| 2018/0373609 A1* | 12/2018 | Beerens | G06F 11/3027 |
| 2019/0042125 A1* | 2/2019 | Huh | G06F 11/3034 |
| 2019/0265764 A1 | 8/2019 | Ping | |

OTHER PUBLICATIONS

Wilkins, "How a New Approach to Storage Server Cooling Can Save You Costs", Western Digital Blog, May 29, 2019, 8 pages [retrieved from https://blog.westerndigital.com/storage-server-cooling-new-savings/].

* cited by examiner

*Primary Examiner* — Khoa D Doan
(74) *Attorney, Agent, or Firm* — Morgan, Lewis & Bockius LLP

(57) ABSTRACT

Disclosed are systems and methods for proactively, instead of reactively, biasing parameters of a data storage device based on a spatial position in a storage enclosure. The method includes obtaining a spatial position for the data storage device in a storage enclosure. The method also includes proactively biasing one or more parameters for controlling the device memory, based on the spatial position. The spatial position has a corresponding thermal profile that is predetermined.

20 Claims, 8 Drawing Sheets

PROACTIVELY BIASING PARAMETERS OF DATA STORAGE DEVICE BASED ON SPATIAL POSITION IN STORAGE ENCLOSURE

BACKGROUND

Computer and network systems (such as data storage systems, server systems, cloud storage systems, personal computers, and workstations) typically include data storage devices for storing and retrieving data. These data storage devices can include hard disk drives (HDDs), solid-state drives (SSDs), tape storage devices, optical storage drives, and/or hybrid storage devices that include both rotating and solid-state data storage elements, and other mass storage devices. As networked computer systems grow in numbers and capability, there is a need for more storage system capacity. Cloud computing and large-scale data processing further increase the need for digital data storage systems that are capable of transferring and holding very large amounts of data. Data centers typically include many rack-mountable storage units, which store the large amounts of data. One approach to providing sufficient data storage in data centers is the use of arrays of independent data storage devices. Many data storage devices can be held in an electronics enclosure. An electronics enclosure is a modular unit that can hold and operate independent data storage devices in an array, computer processors, routers and other electronic equipment. The data storage devices are held and operated in close proximity within the electronics enclosure, so that many data storage devices can be fit into a defined volume. Operating many data storage devices within close proximity within the electronics enclosure can create heat and/or vibration issues leading to premature failure of the data storage devices. Accordingly, electronics enclosures typically include fans or other cooling devices. For example, an enclosure may have fans on one side pulling out hot air while cold air enters the enclosure at the opposite end. This results in a temperature gradient across the subsystem.

Typically, SSDs are individual units. SSDs of same type behave similarly and are usually tuned for the worst case scenario of the committed range. That is, if the SSD is expected to work from 0 to 70° C., then the parity management and cell voltage distribution (CVD) may be tuned to work in those conditions leading to more overhead than necessary for the SSD that works in better environment. Server/storage arrays situated in racks of data centers may experience different thermal conditions based on the nature of airflow and position in the rack.

In some enclosures, the drives present in slots at the rear end may heat up more compared to slots at the front end. Some systems solve such enclosure problem by allowing more air to flow through the rack; however, thermal regions are still not the same across the rack positions. The storage enclosure typically treats all storage drives alike; however, the drives which are towards the rear end of the enclosure are more prone to reaching thermal throttling, compared to other drives, leading to quality-of-service (QoS) drop in affected drives. Typical SSDs may have thermal throttling schemes which are usually reactive and impact QoS at an unexpected time.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, proactively biasing parameters of a data storage device based on a spatial position in a storage enclosure.

One or more implementations of the subject technology provide several performance benefits that improve the functionality of a computer. By avoiding and/or reducing thermal throttling of data storage devices (e.g., SSDs), the performance of the data storage devices may be improved. In turn, a host computer coupled to the data storage devices also receives the benefits of the data storage devices' improved performance.

Figure 1:
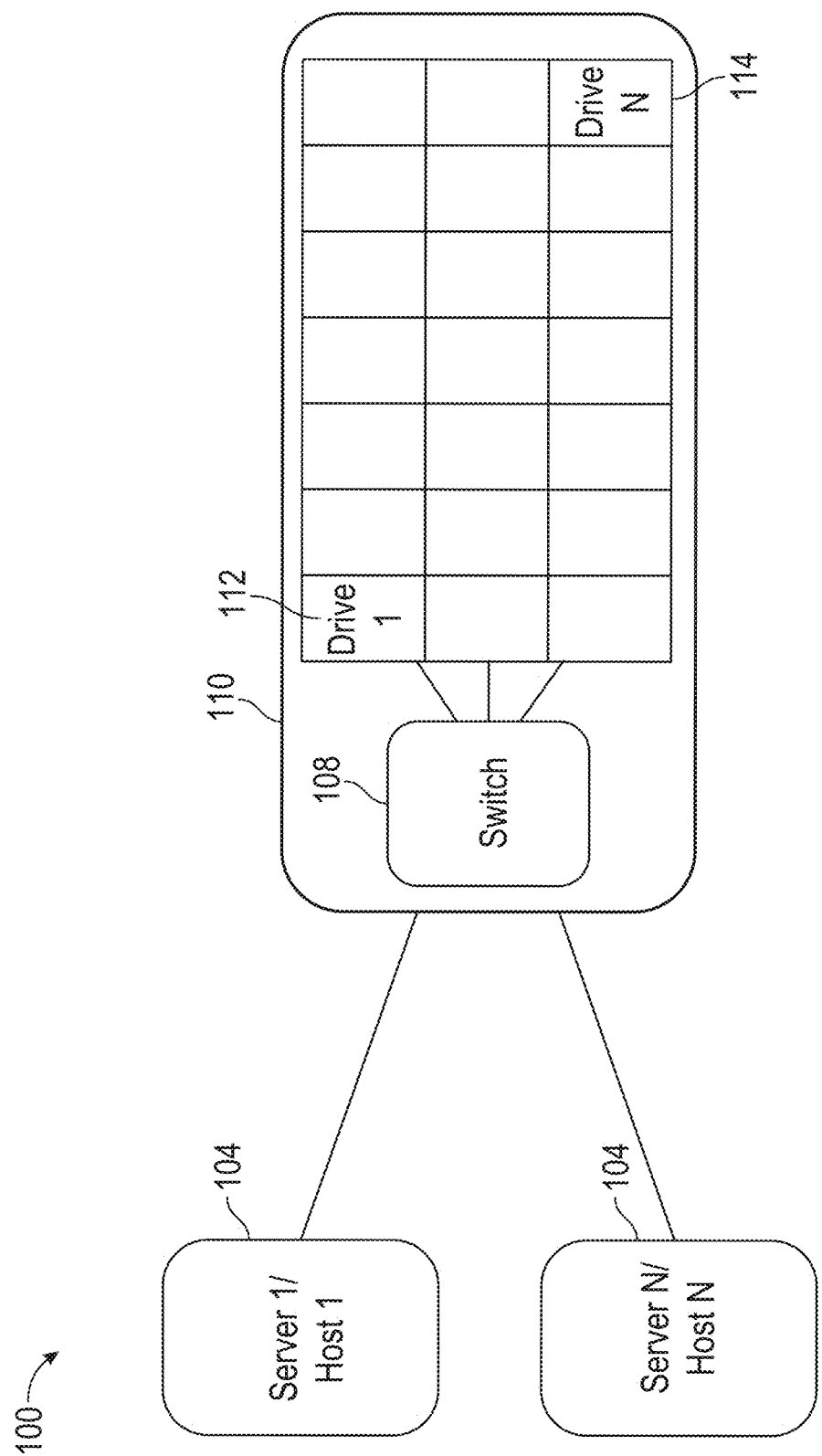
FIG. 1 shows an example computing system, according to one or more embodiments.

FIG. 1 shows an example computing system 100, according to one or more embodiments. The system 100 may include one or more servers 104 coupled to a storage array 110. The storage array 110 may include a switch 108 that is coupled to an enclosure 114 that includes a plurality of data storage devices 112, such as drives. In this example, the drives may include drive 1, . . . , drive N. The switch 108 may be, for example, a serial attached small computer system interface (SCSI) expander (or an SAS expander). The drives may be, for example, configured as just a bunch of disks (JBOD) or just a bunch of flash (JBOF). The switch 108 may be a peripheral component interconnect express (PCIe) switch and the drives may be configured as a nonvolatile memory (NVM) express over fabrics (NVMeoF) JBOF. The storage array 110 may be located in a remote data center in which case the one or more servers 104 may be communicatively coupled to the storage array via a network, and the switch 108 may be a PCIe switch. Although not shown, in some aspects, the storage array 110 may be coupled to a server motherboard via a back plane, in a dense server configuration. In another dense server configuration, the storage array 110 may be coupled to a compute unit via an active or passive backplane. The dense server may be located in a remote data center and may be communicatively coupled to one or more application servers via a network. A server may be sometimes referred to as a host, a host system, a host computer, or a host device. A data storage device may be sometimes referred to as a drive, a storage device, a data storage system, or a device.

Figure 2A:
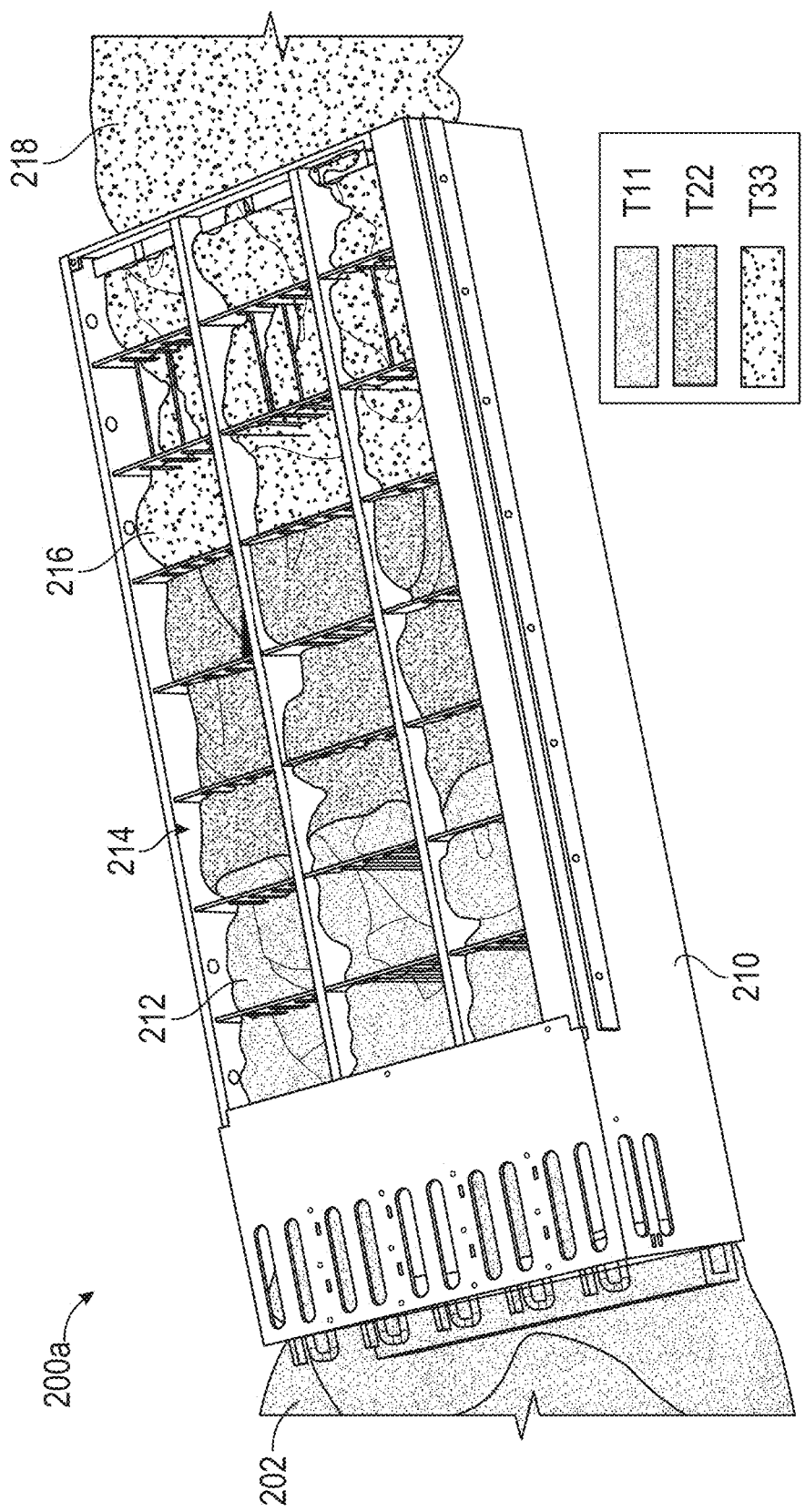
FIG. 2A shows an example storage enclosure, according to one or more embodiments.

FIG. 2A shows an example storage enclosure 200a, according to one or more embodiments. The storage enclosure may hold drives that have different form factors, including height, depth and storage capacity. The enclosure may include a casing 210 that may include one or more compartments or physical partitions (sometimes called drive slot position or rack position; e.g., partitions 212, 214, 216) to hold data storage devices (e.g., hard disk drives or SSDs or storage devices in any other form factor). One or more fans may drive air flow from the region labeled 218 to the region 202, to cool the enclosure and the drives in the compartments. This causes the drives in the individual compartments 212, 214, 216 to operate at different temperatures. Temperature T33 (e.g., in the region 218 and the compartment 216) is likely to be lower than temperature T22 (e.g., in the compartment 214) which is likely to be lower than temperature T11 (e.g., in the compartment 212 and the region 202). In other words, cool air enters the enclosure and gradually warms up and hot air leaves the enclosure when the drives are configured to be placed and operated within the enclosure. In some aspects, there may be multi-zone cooling that brings cold air from the front to the rear of the enclosure via vents or other means. Even in that case, the temperature T33 may be cooler compared to T22 and T11.

Figure 2B:
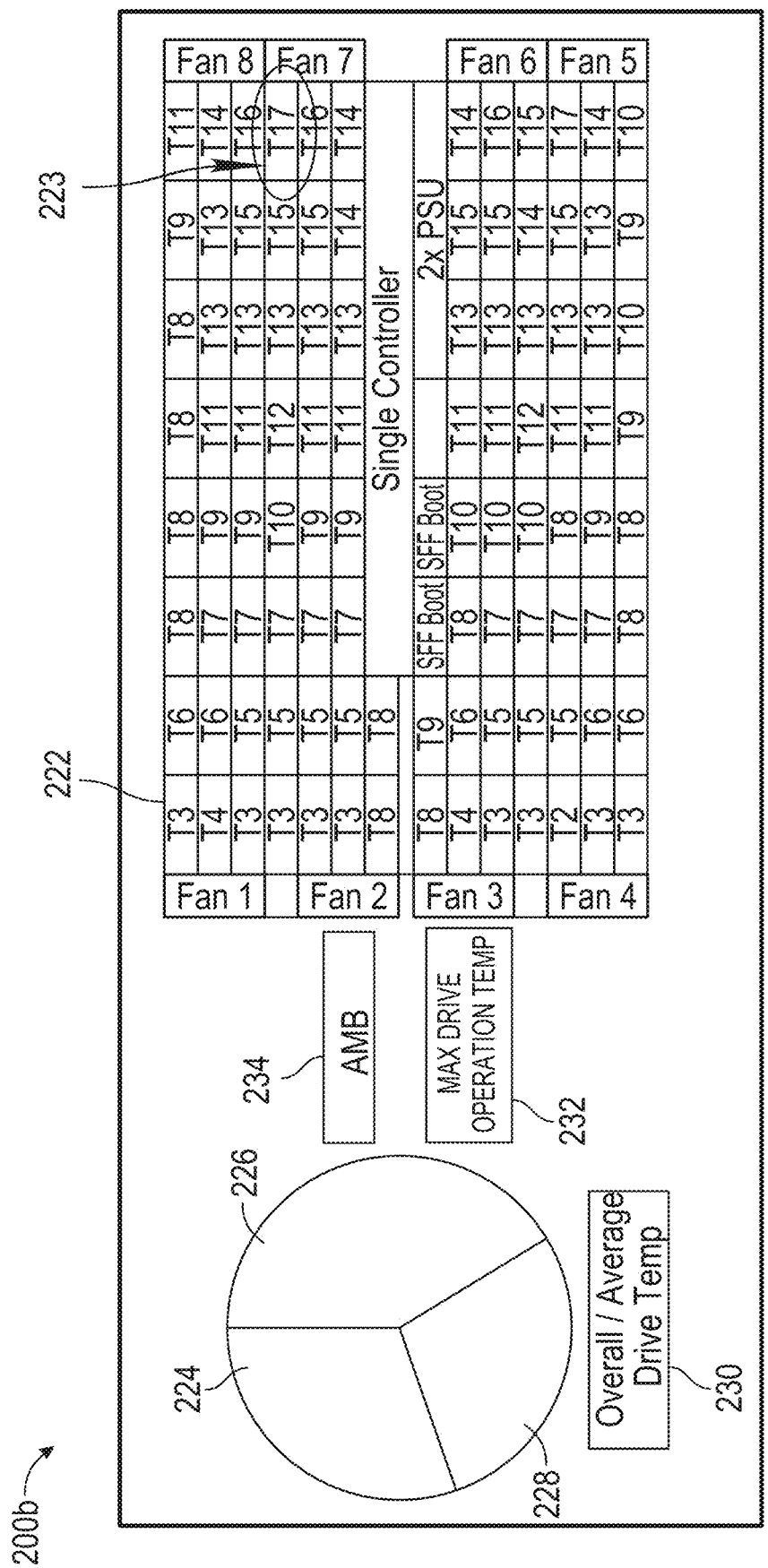
FIG. 2B shows an example thermal map for a storage enclosure, according to one or more embodiments.

FIG. 2B shows an example thermal map 200b for the storage enclosure 200a, according to one or more embodiments. Fans 1, . . . 4 may be located near the front of the enclosure (e.g., near the region 218 of FIG. 2A) and may send air through the enclosure. Fans 5, 6, 7 and 8 may be located near the opposite end of the enclosure (e.g., near the region 202 of FIG. 2A) and help remove air from the enclosure. In some aspects, the fans may be configured differently. For example, the fans may be positioned at different locations, act as a vent, or send cold air in different directions. Although FIG. 2B shows fans 1, . . . , 4 located near the front and fans 5, 6, 7, and 8 located near the opposite end of the enclosure, in some aspects, there may be more or less number of fans than the ones shown. Temperatures T3, T4, T5, T6, T7, T8, T9, T10, T11, T12, T13, T14, T15, T16, and T17 may generally indicate low to high temperatures. Temperatures T3, T4, T5, T6, T7, T8, and T9 may map to drive slot positions near the front or side edges of the enclosure. Temperatures T8, T9, T10, T11, T12, T13, T14, T15, T16, and T17 may map to individual drive slot positions near the back or middle portions of the enclosure. During operation, the drive enclosure is likely to have drive slots that exceed a temperature threshold. For example, the drive slot position 223 with temperature T17 may be an outlier that is near or above a threshold temperature. As temperatures rise near the back of the enclosure, drives in those drive slots are likely to be subject to thermal throttling. Each drive slot position may correspond to a temperature (or a range of temperatures). For ease of understanding, in some aspects, the thermal map 200b may be shown to include table 222 that maps the individual drive slots to temperatures. The table 222 may include data for mapping the locations of the fans, the drive slots, temperatures, and/or one or more controllers. The storage enclosure 200a or any of its internal components or any other external management entity, firmware, or software, may include data for mapping the locations of the fans, the drive slots, temperatures, expanders, and/or the one or more controllers or switches. In some aspects, the thermal map 200b may include just the table 222. In some aspects, the thermal map 200b may include information such as the ambient temperature 234, the maximum drive operation temperature 232, the overall or average drive temperature 230, and/or a distribution of temperatures (e.g., a temperature pie chart including portions 224, 226 and 228).

Figure 2C:
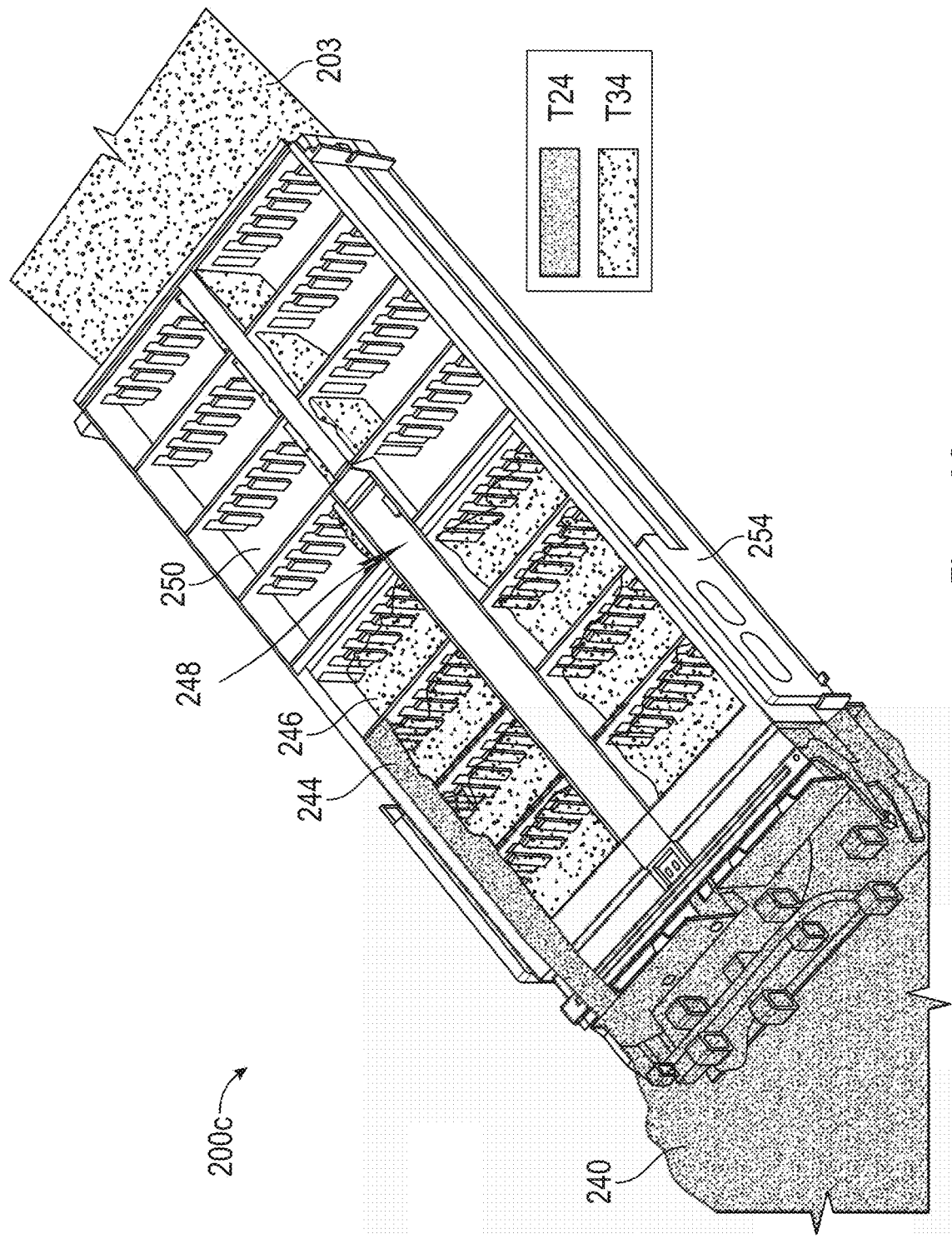
FIG. 2C shows another example storage enclosure, according to one or more embodiments.

FIG. 2C shows another example storage enclosure 200c, according to one or more embodiments. Similar to the enclosure 200a shown in FIG. 2A, the enclosure 200c may include drives having different form factors in terms of height, depth and storage capacity. The enclosure may include a casing 254 that may include one or more compartments or physical partitions (sometimes called drive slot position or rack position; e.g., partitions 246 and 250) to hold data storage devices (e.g., hard disk drives or SSDs or store device in any other form factor). One or more fans may similarly drive air flow from the region labeled 203 to the region 240, to cool the enclosure. In contrast to FIG. 2A, cool air may additionally be introduced and circulated around the enclosure (e.g., region 244) and/or within the enclosure (e.g., region 248) to reach the side, middle and rear end of the enclosure. This may cause the compartments and the drives therein (shown in FIG. 2C) to maintain more uniform temperatures (during operation) than those of FIG. 2A. During operation, the overall or average temperature of the compartments and the drives therein (shown in FIG. 2C) may be lower than those of FIG. 2A. Hence, the individual compartments 246 and 250 may have temperatures (during operation) that are closer to each other, and temperatures T24 and T34 may be closer to each other than the temperatures T11, T22 and T33.

Figure 2D:
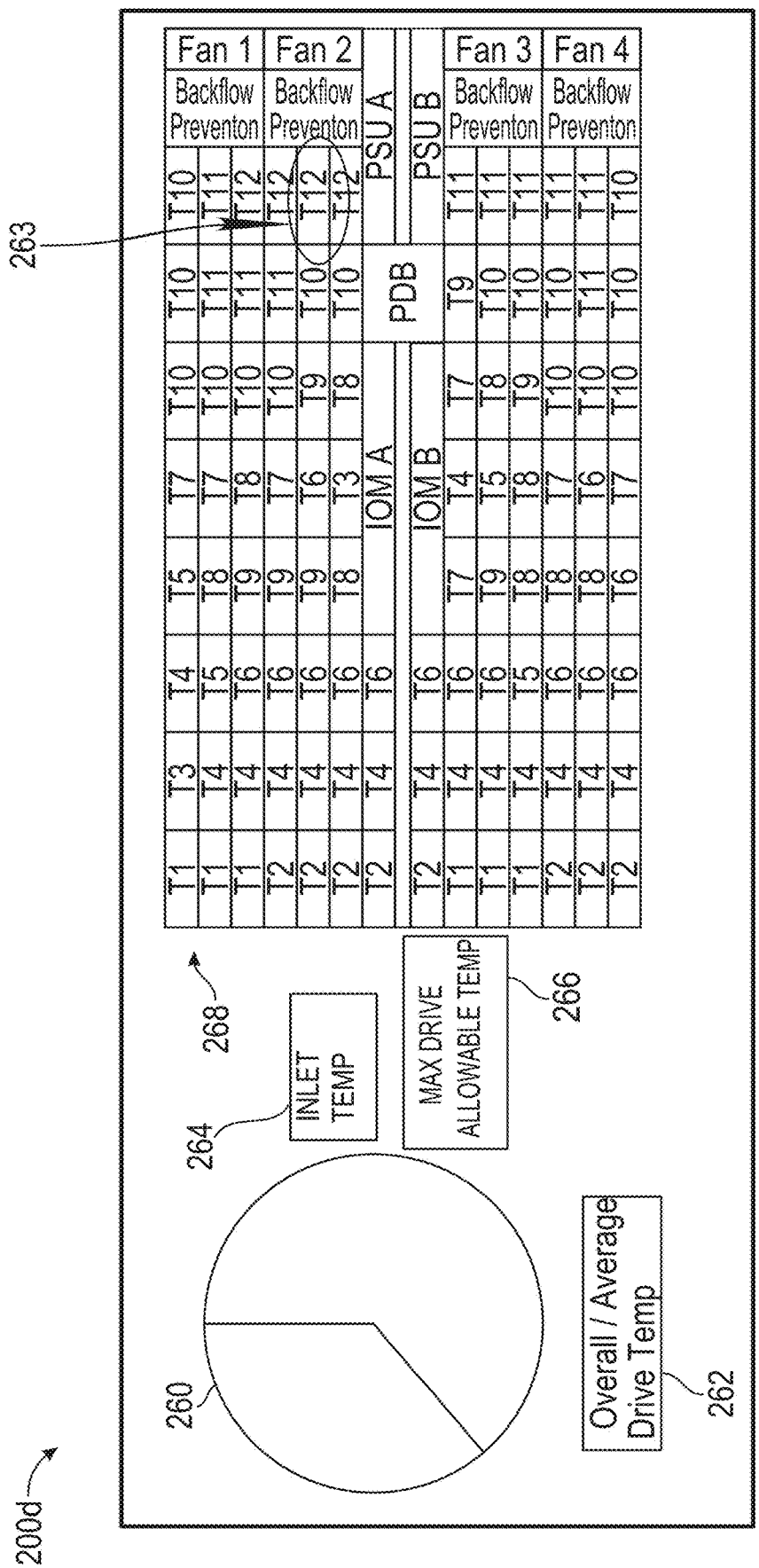
FIG. 2D shows another example thermal map, according to one or more embodiments.

FIG. 2D shows an example thermal map 200d for the storage enclosure 200c, according to one or more embodiments. Table 268 is similar to the table 222 in FIG. 2B. In FIG. 2D (compared to FIG. 2B), the temperatures of the slots (or the drives therein) may be more uniform, and there may be a less number of slots having extreme temperatures (e.g., slot 263 with T12) as a result of the extra ventilation. The thermal map 200d may include information such as the inlet temperature 264, the maximum drive allowable temperature 266, an overall or average drive temperature 262, and/or a distribution 260 of temperatures in the enclosure.

In some aspects, a system may include a server/storage array, enclosure or an input-output (I/O) module providing a spatial position to individual solid state devices (SSDs) in the storage system, based on static analysis. The individual SSD in turn may use that information to proactively bias its flash translation layer (FTL) schemes aligning with a larger scheme. The biasing in individual SSDs may include proactively changing at least one of the FTL parameters, such as error correction (ECC)/parity parameters, FTL die parallelism parameters for operational parallel units, NAND trim parameters, memory refresh cycle parameters, and clock management, according to the position in the server rack. A goal may be to ensure that any of those SSDs in the enclosure/server do not hit upon thermal throttling blockage, which typically leads to inaccessible devices, and further leads to reduced QoS, especially when there is a data retrieval dependency on a particular SSD in a throttling state machine. Enabling FTL biasing based on where the SSD is located and what is anticipated sets up the device to handle that scenario. A proactive FTL design according to enclosure position reduces unwanted throttling.

Proactively managing the parameters enables the server/storage system to provide needed parity for the underlying thermal requirements, and allow SSDs to perform efficiently based on underlying conditions while avoiding throttling. The techniques described herein enable resource efficiency, since the SSDs in colder (outward regions) location can tone down the parity ratio and SSDs in hot regions of a server/storage array can account for more parity than typical error management. In comparison, traditional SSDs work on a fixed large range of parity which is inefficient.

In some aspects, an SSD FTL (e.g., an FTL module of a controller 401 of FIG. 4) may maintain a vendor-specific rack position to thermal profile and/or thermal shaping table. Based on this table mapping, the FTL may make decision (with sufficient margins) to ensure that the device does not hit a thermal threshold to avoid throttling. The rack information may be based on a static temperature analysis for a vendor enclosure. Since a hot SSD is likely to contribute to more thermal energy to its surroundings impacting neighboring SSDs, proactively biasing FTL of each SSD is likely to alleviate the situation. In some aspects, some SSDs in enclosure may manage this table and other SSDs may use as the case may demand.

In some aspects, biasing in individual SSDs includes proactively adjusting at least one of the following FTL parameters based on SSD positioning within an enclosure:

Parity ratio—This may include increased or decreased error correction code (ECC) protection based on thermal conditions and the NAND nodes. This may also include different exclusive-or (XOR) protection patterns or bins based on proactive thermal outlook obtained from the rack table. For example, instead of checkerboard pattern (required for plane-to-plane shorts), the FTL may opt for simple linear patterns only until block open when it determines that the plane shorts are not possible in a given memory node for the underlying temperature associated to server/storage array slots;

FTL Die parallelism—This may include increased or decreased performance based on storage enclosure position or thermal conditions by using only certain dies and/or flash channels together at any point in time. This may also include variable die usage policy between reads and writes. For example, the reads may happen in parallel via all dies, but the writes across all dies at any point may be restricted according to its rack position, thereby voluntarily lowering its write/garbage collection (GC) performance;

NAND trim—This may involve operating some dies in an SSD at lower trim rates vastly helping the thermal cause. This may also include using a different NAND programming voltage and voltage window time. For example the SSD may apply smaller window and less voltage for improved NAND health on anticipating hot environment in the enclosure. In some cases, the techniques described herein are used for drives that are non-redundant array of independent disks (RAIDs); and Proactive resource (cache) on or off and/or clock management—This includes proactively managing resource on/off in accordance with the overall drive position. In some cases, the clock frequencies for different components (e.g., controller clock, flash channel clock, NAND program TRIM) in SSDs may be set in accordance with the enclosure position.

Any of the above parameters may be proactively managed to ensure that the drives do not hit thermal throttling. In some systems, the drives throttle with reduced performance when they hit a temperature threshold and a sudden throttling hurts performance of the drives (or SSDs).

In some aspects, the FTL may proactively adjust memory refresh operations according to the position in the enclosure, after the drives start functioning.

In some aspects, the drives may follow different storage density policy according to their position in server or storage enclosure. For example, if the host allows the capacity point to be altered for some SSDs, then SSDs taking hot locations may opt for hybrid writes rather than triple-level cell (TLC) writes owing to better data protection for a different performance point. This may impact the routing of both host data and GC data.

The cell voltage distribution (CVD) logic is closely associated with temperature management and data reliability. In some aspects, the FTL may adjust its CVD policy in accordance with the rack position.

In some aspects, one or more FTL parameters may be proactively adjusted initially (e.g., during initial operation) based on the location of a drive within the enclosure, and some other FTL parameters may be adjusted in phases based on system design. Various other adjustments and flows are possible based on this example, including adjusting all parameters in stages or in phases, and/or as needed. In some aspects, SSDs may be supplied for a wide range of known temperature operations and the users may be enabled to use specific custom types according to the planned positioning of SSDs in the server/storage array. For example, SSDs may be type 1, type 2 and type 3 SSDs, where type 1 is tuned for 0° C. to 40° C., type 2 for 30° C. to 60° C., type 3 for 50° C. to 70° C., and the like, and the users may use each type in corresponding slots in a server or storage array or enclosure based on final thermal profile suitable for their enclosure model. SSDs may be also provided with different thermal wear out components for each mentioned type enabling better return on investments. By not needing to have drives work in a large thermal range, cost efficiency may be obtained by manufacturing different models and using the right models in appropriate slots in an enclosure.

Using the techniques described herein, different product families may be eliminated, using a firmware implementation where user refers to a vendor-specific inquiry page and does the reactive/proactive tuning based on the user's individual requirement by a simple command which tweaks all the above discussed parameters.

Overall performance is more likely to improve since out of N number of SSDs, only say N/16 or N/8, may need to operate under conditions according to the techniques described herein. Furthermore, any such loss in performance may be recovered by enabling other SSD's run at higher speeds where FTL explicitly suppresses thermal protection. For example, the FTL may suppress thermal protection where SSDs operate in stable condition (say within a range of 30° C.).

In some aspects, the system may have different modes of thermal profiling of an SSD or a drive. This may be similar to servers where there are options for profiling for various modes (e.g., balanced performance, performance, low power, high power). Similar profiling may be performed at the drive level for an SSD or drive so that users can enable or disable any feature described herein, depending on vendor requirements.

When an SSD is configured for a slot, the FTL biasing may be applied initially to that SSD based on the slot. If the slot changes, then a reconfiguration may help, but associated firmware may need to be modified, and/or parity may need to be rebuilt. The techniques described herein are especially useful when the server environment is known, which is typically the case. In scenarios where SSD position changes, during boot up, vendor-specific requirements may be used for FTL biasing.

Figure 3:
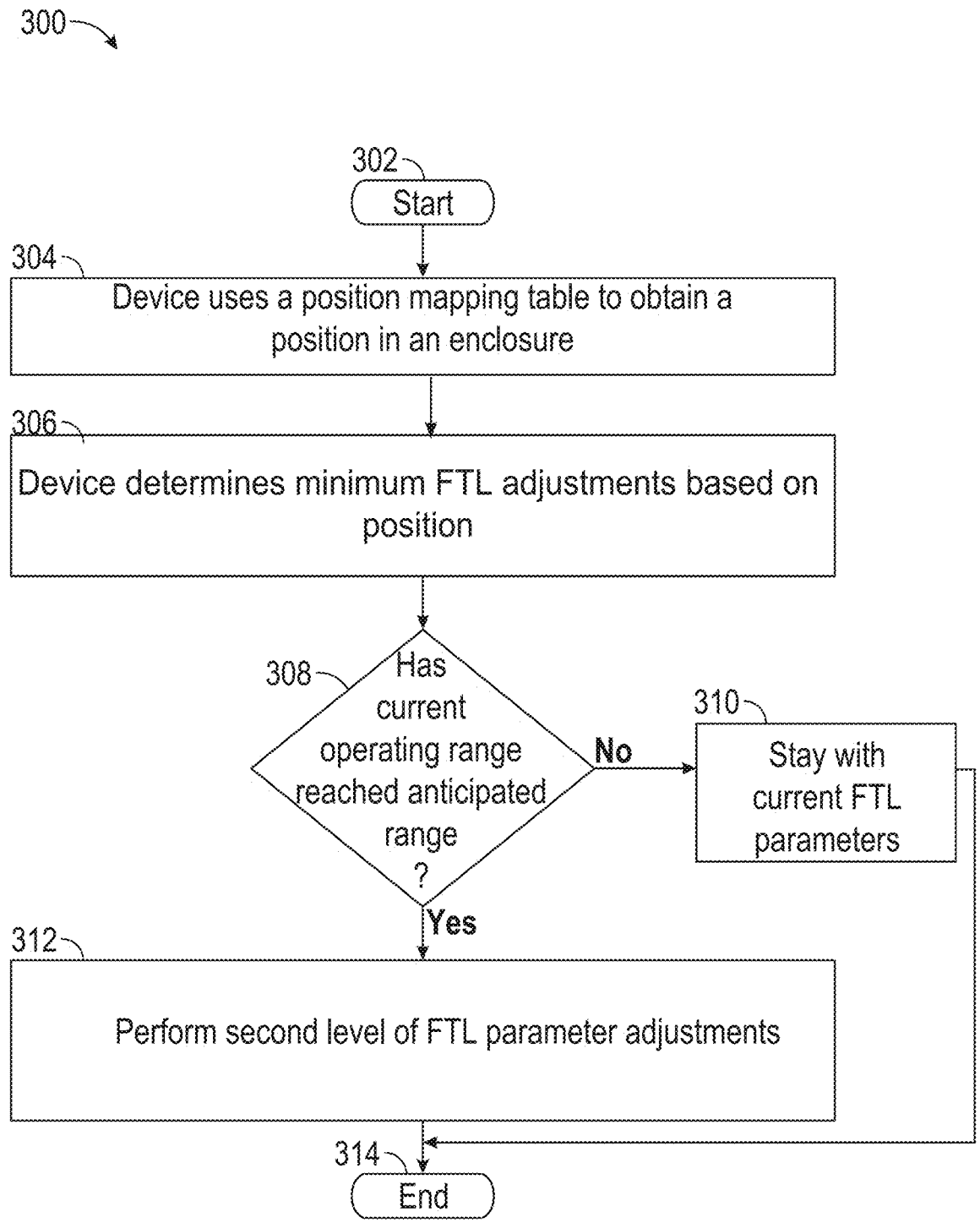
FIG. 3 shows a flowchart of an example process for proactively biasing parameters of a data storage device based on a spatial position in a storage enclosure, according to one or more embodiments.

FIG. 3 shows a flowchart of an example process 300 for proactively biasing (302-314) parameters of a data storage device based on spatial position in a storage enclosure, according to one or more embodiments. A storage device (e.g., storage device 400 described below in reference to FIGS. 4 and 5) may use a position mapping table to obtain (304) a position in an enclosure. The storage device may determine (306) minimum adjustments to flash translation layer (FTL) parameters based on the position. The adjustments may include updates to parity management (ratio), memory refresh thresholds, and/or CVD parameters. Subsequently, the device determines (308) if a current operating range (e.g., temperature range) has reached an anticipated range (e.g., a threshold temperature(s)). If the anticipated range is not reached, then the device does not modify (310) (i.e., stays with) the current FTL parameters. If the anticipated range is reached, the device may affect (312) a second level of FTL parameter adjustments. This may include monitoring and changing die parallelism, changing NAND trim voltage and trim window, and/or device clock adjustments. In some aspects, at least some of the steps in the flowchart (e.g., steps 308, 310, 312) may be repeated during operation of the device. In some aspects, at least some of the steps in the process 300 may be repeated until an anticipated range is reached. In some aspects, different parameters may be adjusted at different times during operation of the device.

Figure 4:
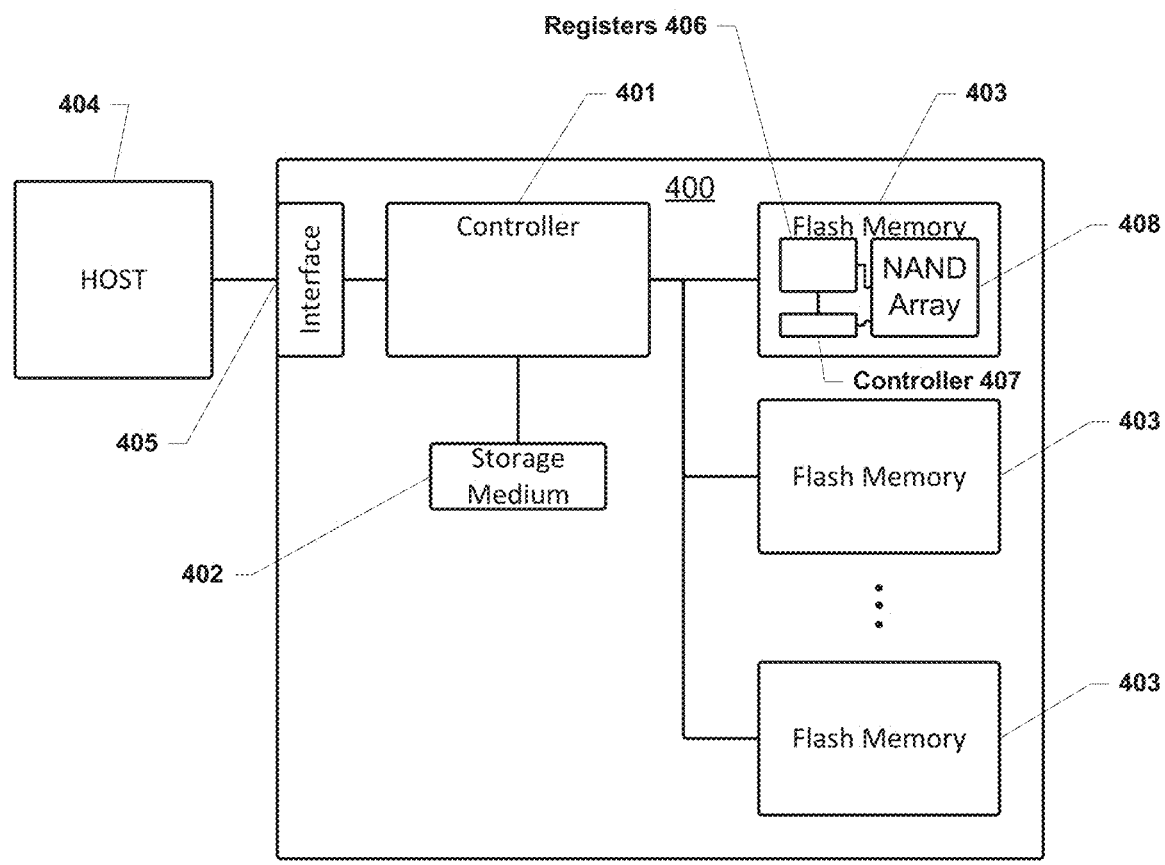
FIG. 4 is a block diagram illustrating components of an example data storage system, according to aspects of the subject technology.

FIG. 4 is a block diagram illustrating components of an example data storage system, according to aspects of the subject technology. A data storage system may be sometimes referred to as a system, a data storage device, a storage device, or a device. As depicted in FIG. 4, in some aspects, a data storage system 400 (e.g., a solid-state drive (SSD)) includes a data storage controller 401, a storage medium 402, and a flash memory array including one or more flash memory 403. The controller 401 may use the storage medium 402 for temporary storage of data and information used to manage the data storage system 400. The controller 401 may include several internal components (not shown), such as a read-only memory, other types of memory, a flash component interface (e.g., a multiplexer to manage instruction and data transport along a serial connection to the flash memory 403), an input/output (I/O) interface, error correction circuitry, and the like. In some aspects, the elements of the controller 401 may be integrated into a single chip. In other aspects, these elements may be separated on their own personal computer (PC) board.

In some implementations, aspects of the subject disclosure may be implemented in the data storage system 400. For example, aspects of the subject disclosure may be integrated with the function of the data storage controller 401 or may be implemented as separate components for use in conjunction with the data storage controller 401.

The controller 401 may also include a processor that may be configured to execute code or instructions to perform the operations and functionality described herein, manage request flow and address mappings, and to perform calculations and generate commands. The processor of the controller 401 may be configured to monitor and/or control the operation of the components in the data storage controller 401. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 401 and/or its processor. One or more sequences of instructions may be software stored and read from the storage medium 402, the flash memory 403, or received from a host device 404 (e.g., via a host interface 405). ROM, the storage medium 402, the flash memory 403, represent examples of machine or computer readable media on which instructions/code executable by the controller 401 and/or its processor may be stored. Machine or computer readable media may generally refer to any medium or media used to provide instructions to the controller 401 and/or its processor, including volatile media, such as dynamic memory used for the storage media 402 or for buffers within the controller 401, and non-volatile media, such as electronic media, optical media, and magnetic media.

In some aspects, the controller 401 may be configured to store data received from the host device 404 in the flash memory 403 in response to a write command from the host device 404. The controller 401 is further configured to read data stored in the flash memory 403 and to transfer the read data to the host device 404 in response to a read command from the host device 404. A host device 404 may be sometimes referred to as a host, a host system, or a host computer.

The host device 404 represents any device configured to be coupled to the data storage system 400 and to store data in the data storage system 400. The host device 404 may be a computing system such as a personal computer, a server, a workstation, a laptop computer, a personal digital assistant (PDA), a smart phone, or the like. Alternatively, the host device 404 may be an electronic device such as a digital camera, a digital audio player, a digital video recorder, or the like.

In some aspects, the storage medium 402 represents volatile memory used to temporarily store data and information used to manage the data storage system 400. According to aspects of the subject technology, the storage medium 402 is random access memory (RAM), such as double data rate (DDR) RAM. Other types of RAMs may be also used to implement the storage medium 402. The memory 402 may be implemented using a single RAM module or multiple RAM modules. While the storage medium 402 is depicted as being distinct from the controller 401, those skilled in the art will recognize that the storage medium 402 may be incorporated into the controller 401 without departing from the scope of the subject technology. Alternatively, the storage medium 402 may be a non-volatile memory, such as a magnetic disk, flash memory, peripheral SSD, and the like.

As further depicted in FIG. 4, the data storage system 400 may also include the host interface 405. The host interface 405 may be configured to be operably coupled (e.g., by wired or wireless connection) to the host device 404, to receive data from the host device 404 and to send data to the host device 404. The host interface 405 may include electrical and physical connections, or a wireless connection, for operably coupling the host device 404 to the controller 401 (e.g., via the I/O interface of the controller 401). The host interface 405 may be configured to communicate data, addresses, and control signals between the host device 404 and the controller 401. Alternatively, the I/O interface of the controller 401 may include and/or be combined with the host interface 405. The host interface 405 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 405 may be configured to implement only one interface. Alternatively, the host interface 405 (and/or the I/O interface of controller 401) may be configured to implement multiple interfaces, which may be individually selectable using a configuration parameter selected by a user or programmed at the time of assembly. The host interface 405 may include one or more buffers for buffering transmissions between the host device 404 and the controller 401.

The flash memory 403 may represent a non-volatile memory device for storing data. According to aspects of the subject technology, the flash memory 403 includes, for example, a NAND flash memory. The flash memory 403 may include a single flash memory device or chip, or (as depicted in FIG. 4) may include multiple flash memory devices or chips arranged in multiple channels. The flash memory 403 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 403 is used to access one or more internal registers 406 and an internal flash controller 407 for communication by external devices (e.g., the controller 401). In some aspects, the registers 406 may include address, command, and/or data registers, which internally retrieve and output the necessary data to and from a NAND memory cell array 408. A NAND memory cell array 408 may be sometimes referred to as a NAND array, a memory array, or a NAND. For example, a data register may include data to be stored in the memory array 408, or data after a fetch from the memory array 408 and may also be used for temporary data storage and/or act like a buffer. An address register may store the memory address from which data will be fetched to the host device 404 or the address to which data will be sent and stored. In some aspects, a command register is included to control parity, interrupt control, and the like. In some aspects, the internal flash controller 407 is accessible via a control register to control the general behaviour of the flash memory 403. The internal flash controller 407 and/or the control register may control the number of stop bits, word length, receiver clock source, and may also control switching the addressing mode, paging control, coprocessor control, and the like.

In some aspects, the registers 406 may also include a test register. The test register may be accessed by specific addresses and/or data combinations provided at the interface of flash memory 403 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 403 (e.g., read levels) to dynamically vary how data is read from the memory cells of the memory arrays 408. The registers 406 may also include one or more data latches coupled to the flash memory 403.

It should be understood that in all cases data may not always be the result of a command received from the host 404 and/or returned to the host 404. In some aspects, the controller 401 may be configured to execute a read operation independent of the host 404 (e.g., to verify read levels or the bit error rate (BER)). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 401 may perform the operations identified in blocks 302-314 and/or blocks 502-504. The controller 401 may cause the operations identified in blocks 302-314 and/or blocks 502-504 to occur, or the controller 401 may provide instructions to cause or facilitate the controller 407 (and the registers 406) to perform operations identified in blocks 302-314 and/or blocks 502-504.

Figure 5:
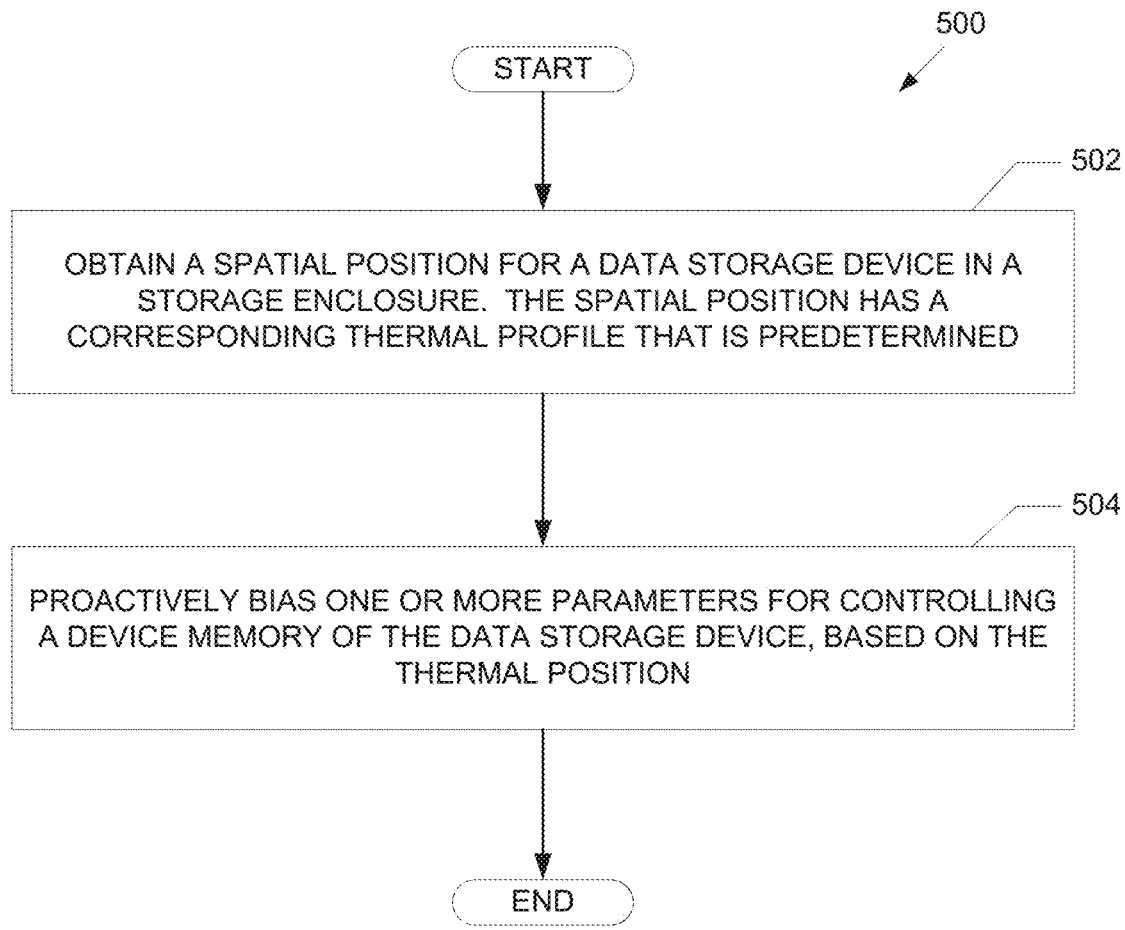
FIG. 5 is a flowchart illustrating an example process for proactively biasing parameters of a data storage device based on a spatial position in a storage enclosure, according to one or more embodiments.

It may be instructive to describe the structures shown in FIGS. 1, 2A, 2B, 2C, 2D and 4, with respect to FIG. 5, a flowchart illustrating an example process 500 for proactively biasing parameters of a data storage device based on a spatial position in a storage enclosure, according to one or more embodiments.

One or more blocks of FIG. 5 may be executed by a computing system (including, e.g., a controller of a flash memory, a data storage controller of a data storage system or a solid state storage device (SSD), a processor, or the like). Examples of a computing system or a controller may be the controller 401. Similarly, a non-transitory machine-readable medium may include machine-executable instructions thereon that, when executed by a computer or machine, perform the blocks of FIG. 5. The steps of process 500 may be implemented as hardware, firmware, software, or a combination thereof. For example, a data storage device (e.g., the storage device 400) may include a device memory (e.g., the memory 403) and a controller (e.g., the controller 401).

The controller may be configured to obtain (502) a spatial position for the data storage device in a storage enclosure. The controller may also be configured to proactively bias (504) one or more parameters for controlling the device memory, based on the spatial position. The spatial position may have a corresponding thermal profile, and the corresponding thermal profile may be predetermined. Proactively biasing the one or more parameters may include changing one or more parameters based on a predetermined thermal profile, changing one or more parameters prior to (or without) determining a current thermal profile, or changing one or more parameters without reacting to a current thermal profile.

In some aspects, the data storage device may include a thermal map (e.g., the example thermal maps or maps of similar formats shown in FIGS. 2B and 2D). The thermal map may map each drive slot position within the storage enclosure to its corresponding thermal profile. Each drive slot position may correspond to a respective spatial position for a respective data storage device in the storage enclosure.

In some aspects, the controller 401 may be configured to determine the thermal profile based on a thermal map that has mapped each drive slot position within the storage enclosure to a corresponding thermal profile. The map may be determined prior to the controller obtaining the spatial position or prior to operating the data storage device or prior to measuring a temperature of the data storage device in real time. In this way, the techniques described herein may be different from reactive methods or reacting to a temperature measured in real-time.

In some aspects, the thermal table may include a mapping of each drive slot position to the corresponding thermal profile. The mapping may be based on a static temperature analysis of the storage enclosure. The spatial position may be one of the drive slot positions.

In some aspects, the controller 401 may be further configured to update the thermal table. The controller 401 may update or manage the table based on a temperature change of the storage device, the change may be measured in real time.

In some aspects, the one or more parameters may include a parity control parameter for controlling a parity ratio of the device memory, based on the spatial position.

In some aspects, the parity control parameter may be used for controlling error correction code (ECC) protection based on the spatial position and nodes of the device memory. Thermal conditions may correspond to thermal profiles (e.g., temperatures). The controller may change the parity control parameter based on the thermal profile (e.g., temperature). The device memory may consist of a NAND array of memory cells. NAND nodes are the memory nodes in the array.

In some aspects, for the parity control parameter, the controller 401 may be further configured to select an exclusive-or (XOR) protection pattern based on the spatial position. For example, if A and B are two data sets, then A (XOR) B is stored in the device such that when retrieval of A fails, then B is XORed with XOR data to retrieve A as follows: A=B (XOR) {A (XOR) B}. This process of retrieving lost data from XOR parity is called DeXOR. The controller may change the protection strength through different XOR schemes (and different XOR RAM or XOR bins) leading to different XOR overhead. For example, for SSD's in slots where temperatures are in a predetermined range, the controller may use less XOR overhead or less XOR RAM or bins.

In some aspects, for the parity control parameter, the controller 401 may be further configured to select a linear pattern, instead of a checkerboard pattern, required for plane-to-plane shorts, while a memory block of the device memory is open, in accordance with a determination that the plane-to-plane shorts are not possible for underlying thermal conditions, based on the spatial position.

In some aspects, the data storage device may include plurality of dies. The one or more parameters may include a parallelism control parameter for controlling die parallelism for the plurality of dies based on the spatial position. One of the plurality of dies may include the device memory (e.g., the dies or the dies used concurrently, for a thermal profile).

In some aspects, the data storage device may include plurality of dies. The one or more parameters may include a parallelism control parameter for controlling, based on the spatial position, a variable die usage policy between reads and writes. One of the plurality of dies may include the device memory.

In some aspects, the parallelism control parameter may be used for restricting, based on the spatial position, a number of reads in parallel allowed across the plurality of dies.

In some aspects, the parallelism control parameter may be used for restricting, based on the spatial position, a number of writes in parallel allowed across the plurality of dies according to the data storage device's spatial position (thereby lowering the data storage device's write or garbage collection (GC) performance).

In some aspects, the one or more parameters may include one or more memory trim parameters associated with are used to control a NAND trim (for non-RAID drives) for using different NAND a programming voltage and a voltage window time for the device memory. The controller 401 may be configured to adjust the one or more memory trim parameters based on the spatial position.

In some aspects, for the one or more memory trim parameters: when the device memory is healthy, the controller 401 may be configured to apply a first programming voltage and use a first voltage window time for the device memory. A healthy NAND is expected to operate at a higher temperature. Low program/erase cycles (PEC) may indicate a healthy NAND. Some NANDs may be inherently healthy, and some may have poor health due to manufacturing defects. When the device memory is not healthy, the controller 401 may be configured to apply a second programming voltage and use a second voltage window time for the device memory. The first programming voltage is lower than the second programming voltage. The first voltage window time is less than the second voltage window time. The healthy device memory is to operate at a temperature higher than a temperature of the not-healthy device memory. The controller 401 may apply smaller voltage window and less voltage for healthy NAND on anticipating hot environment in the enclosure.

In some aspects, the one or more parameters are for proactively, based on the spatial position, turning on or turning off resources before thermal throttling occurs. Examples of resources may include controller RAM, compute cores, one or many Dies or flash channels are resources. In some aspects, the controller 401 may decrease flash channel clock to avoid thermal throttling.

In some aspects, the one or more parameters is a clock frequency parameter. The controller 401 may be configured to set a clock frequency of the data storage device based on the spatial position of the data storage device in the storage enclosure. The storage enclosure may be configured to store multiple data storage devices (examples of which were described above in reference to FIGS. 2A and 2C). Each of the multiple data storage devices may be configured to use a corresponding clock frequency based on a corresponding spatial position in the storage enclosure. One of the multiple data storage devices includes the data storage device.

In some aspects, the one or more parameters may be used for adjusting memory refresh operations based on the spatial position. Typically, the NAND memory is refreshed once in a while so that their endurance is maintained. Frequency of this refresh may be reduced when the controller 401 determines that the device is in a favorable slot.

In some aspects, the one or more parameters may be used by the controller 401 for controlling a storage density policy based on the spatial position. In some aspects, the storage density policy is for determining whether the data storage device uses hybrid writes rather than triple-level cell (TLC)

writes. This may be the case if the host allows the capacity to be altered for some SSDs, then SSDs taking hot locations may opt for hybrid writes rather than TLC writes owing to better data protection for a different performance point. This may impact the routing of both host data and garbage collection data. The host typically wants a 256 GB device to have that capacity to ensure its capacity obligations are met. Suddenly reducing the capacity and assuming that only 200 GB of that 256 GB is available for usage is not a good solution from a host perspective.

In some aspects, the one or more parameters may be used for controlling cell voltage distributions for the data storage device based on the spatial position. The CVD logic is closely associated to temperature management and data reliability. In some cases, a flash translation layer (FTL) of the controller 401 may adjust its CVD policy in accordance with the drive slot position.

In some aspects, proactively biasing the one or more parameters includes adjusting at least one of a parity ratio, a memory refresh threshold, and cell voltage distributions, for an initial time period, based on the spatial position. The controller may be further configured to adjust the one or more parameters, in accordance with a determination, after the initial time period, that a current operating range for the data storage device has reached a threshold range. The range is the temperature. For example, the data storage device senses its temperature in real time. If the controller determines that the temperature has reached a threshold temperature, the controller may update one or more parameters, or update at least one of the one or more parameters for the data storage device. The at least one of the one or more parameters may include at least one of the following: die parallelism, a memory trim voltage, and a voltage time window, and a clock frequency.

In some aspects, the controller 401 may be further configured to: in accordance with a determination, after the initial time period, that the current operating range for the data storage device has not reached the threshold range, leave the updates to at least one of the one or more parameters unchanged.

Various examples of aspects of the disclosure are described below. These are provided as examples, and do not limit the subject technology.

One or more aspects of the subject technology provide a data storage device that may include a device memory and a controller. The controller may be configured to obtain a spatial position for the data storage device in a storage enclosure. The controller may also be configured to proactively bias one or more parameters for controlling the device memory, based on the spatial position. The spatial position may have a corresponding thermal profile; and the corresponding thermal profile may be predetermined.

In other aspects, methods are provided for proactively biasing parameters of data storage device based on spatial position in storage enclosure. According to some aspects, a method may include obtaining a spatial position for the data storage device in a storage enclosure, and proactively biasing one or more parameters for controlling the device memory, based on the spatial position. The spatial position may have a corresponding thermal profile, and the corresponding thermal profile may be predetermined.

In further aspects, a system may include means for obtaining a spatial position for the data storage device in a storage enclosure, and means for proactively biasing one or more parameters for controlling the device memory, based on the spatial position. The spatial position may have a corresponding thermal profile, and the corresponding thermal profile may be predetermined.

Various implementations of the methods and systems for proactively biasing parameters of data storage device based on spatial position in storage enclosure provides several performance advantages that improve the functioning of the storage device or SSD. A host computer that interfaces with the storage device is also provided with improved functioning by operating the storage device with higher performance and storage capacity. Thus, the described methods and systems provide performance benefits that improve the functioning of a storage device and a host computer.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a device memory; and
   a controller configured to:
      obtain a spatial position for the data storage device in a storage enclosure; and
      proactively bias one or more parameters for controlling the device memory, based on the spatial position, wherein:
         the spatial position has a corresponding thermal profile; and
         the corresponding thermal profile is predetermined.

2. The data storage device of claim 1, further comprising a thermal map, wherein:
   the thermal map maps each drive slot position within the storage enclosure to its corresponding thermal profile; and
   each drive slot position corresponds to a respective spatial position for a respective data storage device in the storage enclosure.

3. The data storage device of claim 1, wherein:
   the controller is configured to determine the thermal profile based on a thermal map that has mapped each drive slot position within the storage enclosure to a corresponding thermal profile.

4. The data storage device of claim 3, wherein:
   the thermal map comprises a mapping of each drive slot position to the corresponding thermal profile;
   the mapping is based on a static temperature analysis of the storage enclosure; and
   the spatial position is one of the drive slot positions.

5. The data storage device of claim 3, wherein the controller is further configured to update the thermal map.

6. The data storage device of claim 1, wherein the one or more parameters include a parity control parameter for controlling a parity ratio of the device memory, based on the spatial position.

7. The data storage device of claim 6, wherein the parity control parameter is for controlling error correction code (ECC) protection based on the spatial position and nodes of the device memory.

8. The data storage device of claim 6, wherein for the parity control parameter, the controller is further configured to select an exclusive-or (XOR) protection pattern based on the spatial position.

9. The data storage device of claim 6, wherein for the parity control parameter, the controller is further configured to:
   select a linear pattern, instead of a checkerboard pattern, required for plane-to-plane shorts, while a memory block of the device memory is open, in accordance with a determination that the plane-to-plane shorts are not possible for underlying thermal conditions, based on the spatial position.

10. The data storage device of claim 1, comprising a plurality of dies, wherein the one or more parameters include a parallelism control parameter for controlling die parallelism for the plurality of dies based on the spatial position, and wherein one of the plurality of dies comprises the device memory.

11. The data storage device of claim 1, comprising a plurality of dies, wherein the one or more parameters include a parallelism control parameter for controlling, based on the spatial position, a variable die usage policy between reads and writes, and wherein one of the plurality of dies comprises the device memory.

12. The data storage device of claim 11, wherein the parallelism control parameter is for restricting, based on the spatial position, a number of reads or writes in parallel allowed across the plurality of dies.

13. The data storage device of claim 1, wherein:
   the one or more parameters comprise one or more memory trim parameters associated with or for being used to control a NAND trim for using a different NAND programming voltage and a voltage window time for the device memory; and
   the controller is configured to adjust the one or more memory trim parameters based on the spatial position.

14. The data storage device of claim 13, for the one or more memory trim parameters:
   when the device memory is healthy, the controller is configured to apply a first programming voltage and use a first voltage window time for the device memory;
   when the device memory is not healthy, the controller is configured to apply a second programming voltage and use a second voltage window time for the device memory;
   the first programming voltage is lower than the second programming voltage;

the first voltage window time is less than the second voltage window time; and the healthy device memory is to operate at a temperature higher than a temperature of the not-healthy device memory.

15. The data storage device of claim 1, wherein:

the one or more parameters is a clock frequency parameter;

the controller is configured to set a clock frequency of the data storage device based on the spatial position of the data storage device in the storage enclosure;

the storage enclosure is configured to store multiple data storage devices;

each of the multiple data storage devices is configured to use a corresponding clock frequency based on a corresponding spatial position in the storage enclosure; and one of the multiple data storage devices comprises the data storage device.

16. The data storage device of claim 1, wherein the one or more parameters are for controlling a storage density policy based on the spatial position, wherein the storage density policy is for determining whether the data storage device uses hybrid writes rather than triple-level cell (TLC) writes.

17. The data storage device of claim 1, wherein:

proactively biasing the one or more parameters comprises adjusting at least one of a parity ratio, a memory refresh threshold, and cell voltage distributions, for an initial time period, based on the spatial position; and the controller is further configured to adjust the one or more parameters, in accordance with a determination, after the initial time period, that a current operating range for the data storage device has reached a threshold range, wherein at least one of the one or more parameters comprises at least one of the following: die parallelism, a memory trim voltage, and a voltage time window, and a clock frequency.

18. The data storage device of claim 8, wherein the controller is further configured to:

in accordance with a determination, after the initial time period, that the current operating range for the data storage device has not reached the threshold range, leave updates to at least one of the one or more parameters unchanged.

19. A method implemented using one or more controllers for one or more data storage devices, the method comprising:

obtaining a spatial position for the data storage device in a storage enclosure; and proactively biasing one or more parameters for controlling a device memory, based on the spatial position, wherein:

the spatial position has a corresponding thermal profile; and the corresponding thermal profile is predetermined.

20. A system, comprising:

means for obtaining a spatial position for a data storage device in a storage enclosure; and means for proactively biasing one or more parameters for controlling a device memory, based on the spatial position, wherein:

the spatial position has a corresponding thermal profile; and the corresponding thermal profile is predetermined.

* * * * *